(12) United States Patent
Ito et al.

(10) Patent No.: US 10,873,090 B2
(45) Date of Patent: Dec. 22, 2020

(54) REDUCED-AREA CURRENT COLLECTORS FOR RECHARGEABLE BATTERIES

(75) Inventors: Yasumasa Ito, Nagoya (JP); Sanjoy Banerjee, New York, NY (US)

(73) Assignee: RESEARCH FOUNDATION OF THE CITY UNIVERSITY OF NEW YORK, New York, NY (US)

( * ) Notice: Subject to any disclaimer, the term of this patent is extended or adjusted under 35 U.S.C. 154(b) by 1959 days.

(21) Appl. No.: 14/129,865

(22) PCT Filed: Jul. 5, 2012

(86) PCT No.: PCT/US2012/045586
§ 371 (c)(1),
(2), (4) Date: Apr. 2, 2014

(87) PCT Pub. No.: WO2013/006715
PCT Pub. Date: Jan. 10, 2013

(65) Prior Publication Data
US 2014/0212712 A1    Jul. 31, 2014

Related U.S. Application Data

(60) Provisional application No. 61/504,836, filed on Jul. 6, 2011.

(51) Int. Cl.
*H01M 4/72* (2006.01)
*H01M 4/04* (2006.01)
(Continued)

(52) U.S. Cl.
CPC .............. *H01M 4/72* (2013.01); *H01M 4/04* (2013.01); *H01M 4/661* (2013.01); *H01M 4/70* (2013.01);
(Continued)

(58) Field of Classification Search
CPC .......... H01M 10/30; H01M 4/70; H01M 4/72; H01M 4/74–747; H01M 4/80–808
See application file for complete search history.

(56) References Cited

U.S. PATENT DOCUMENTS

| | | |
|---|---|---|
| 6,649,305 B1 | 11/2003 | Bugnet et al. |
| 2002/0031701 A1 | 3/2002 | Kawakami et al. |
| 2009/0233159 A1 | 9/2009 | Phillips et al. |

FOREIGN PATENT DOCUMENTS

| | | |
|---|---|---|
| JP | 2002184409 A | 6/2002 |
| WO | 2011047105 A1 | 4/2011 |
| WO | 2013006715 A2 | 1/2013 |

OTHER PUBLICATIONS

Machine Translation of JP 2002184409 originally published to Mashima et al. on Jun. 28, 2002.*

(Continued)

*Primary Examiner* — Kenneth J Douyette
(74) *Attorney, Agent, or Firm* — Andrew M. Metrailer (57) ABSTRACT

A novel electrode current collector design that can improve performance and extend cycle life for rechargeable batteries based on metal electrodeposition is disclosed. The novel electrode current collector has a reduced effective surface area that can help to balance efficiencies between battery electrodes and to ensure non-uniform electrodeposition of metal onto the anode current collector during charge. One result is mitigation of internal short circuits that can cause a battery to fail prematurely.

15 Claims, 7 Drawing Sheets

(51) Int. Cl.
H01M 4/70 (2006.01)
H01M 4/66 (2006.01)
H01M 10/30 (2006.01)
H01M 4/02 (2006.01)

(52) U.S. Cl.
CPC ...... *H01M 10/30* (2013.01); *H01M 2004/021* (2013.01); *H01M 2300/0014* (2013.01); *Y10T 29/49108* (2015.01)

(56) References Cited

OTHER PUBLICATIONS

Zhang et al., Study of zinc electrodes for single flow zinc/nickel battery application, Jan. 4, 2008, Journal of Power Sources, vol. 179, pp. 381-387.*

Bass, K., et al., "Methods for the reduction of shape change and dendritic growth in zinc-based secondary cells," Journal of Power Sources, 1991, pp. 333-351, vol. 35, Elsevier Sequoia, Lausanne.

Bronoel, G., et al., "Development of Ni—Zn cells," Journal of Power Sources, 1991, pp. 243-255, vol. 34, Elsevier Sequoia, The Netherlands.

De Carvalho, M. F., et al., "Study of the influence of the polyalcohol mannitol on zinc electrodeposition from an alkaline bath," Journal of Applied Electrochemistry, 2010, pp. 1625-1632 plus 1 page copyright information, vol. 40, Springer Science+Business Media B.V.

Gallaway, Joshua W., et al., "A Lateral Microfluidic Cell for Imaging Electrodeposited Zinc near the Shorting Condition," Journal of the Electrochemical Society, 2010, pp. A1279-A1286, vol. 157, No. 12, The Electrochemical Society.

Foreign communication from the priority application—International Search Report and Written Opinion, PCT/US2012/045586, dated Mar. 13, 2013, 10 pages.

Foreign communication from the priority application—International Preliminary Report on Patentability, PCT/US2012/045586, dated Jan. 7, 2014, 7 pages.

Ito, Yasumasa, et al., "Zinc morphology in zinc-nickel flow assisted batteries and impact on performance," Journal of Power Sources, 2011, pp. 2340-2345, vol. 196, Elsevier B.V.

Certified copy of provisional patent application entitled "Reduced-area current collectors for rechargeable batteries based on metal electrodeposition with and without fluid motion of electrolyte," by Yasumasa Ito, et al., filed Jul. 6, 2011 as U.S. Appl. No. 61/504,836.

Wen, Yue-Hua, et al., "The inhibition of the spongy electrocrystallization of zinc from doped flowing alkaline zincate solutions," Journal of Power Sources, 2009, pp. 890-894, vol. 193, Elsevier B.V.

Zhu, Jiling, et al., "Influence of surfactants on electrochemical behavior of zinc electrodes in alkaline solution," Journal of Power Sources, 1998, pp. 231-235, vol. 72, Elsevier Science S.A.

* cited by examiner

REDUCED-AREA CURRENT COLLECTORS FOR RECHARGEABLE BATTERIES

CROSS-REFERENCE TO RELATED APPLICATIONS

This application is a filing under 35 U.S.C 371 s the National Stage of International Application No. PCT/US2012/045586 filed Jul. 5, 2012, entitled "Reduced-Area Current Collectors for Rechargeable Batteries," which claims priority to U.S. Provisional Patent Application 61/504,836, filed Jul. 6, 2011, which applications are incorporated by reference herein in their entirety.

STATEMENT OF GOVERNMENT SUPPORT

The invention described and claimed herein was made in part utilizing funds supplied by the U.S. Department of Energy National Energy Technology Laboratory under Contract No. DE-EE0004224 and by the New York State Energy Research and Development Authority under Contract No. 18786. The Government has certain rights in this invention.

BACKGROUND OF THE INVENTION

Field of the Invention

This invention relates generally to rechargeable batteries, and, more specifically, to improved designs for rechargeable batteries.

In order to make use of excess nighttime power plant generation capacity and of intermittent renewable energy sources such as solar and wind and to reduce peaks in energy demand by storing power generated off peak, large electrical energy storage systems are necessary. Making use of these energy sources efficiently is of great importance for both environmental and economical reasons. Long-life rechargeable zinc-based batteries are a most attractive electrical energy storage system due to the low cost and abundant supply of zinc. In addition, zinc-based batteries are safe, non-toxic, scalable, and operate at ambient temperatures without elaborate temperature control systems. However, zinc-based batteries have been plagued by short cycle life. The capacity of most zinc-based batteries usually deteriorates within several hundred cycles, not even close to the several thousand cycles that are envisioned for large electrical storage applications.

As a zinc-based battery is cycled, zinc is stripped from an anode current collector during discharge and is electrodeposited back onto the current collector during charge. Unfortunately, zinc electrodeposition is often uneven, leading to the dendritic development. In conventional, non-flowing zinc-anode batteries, the driving force of mass transfer is molecular diffusion which causes a thick concentration boundary layer of zincate ($Zn(OH)_4^{2-}$) to form on the anode surface during charging. Because of this, the system is driven far from equilibrium, and dendritic zinc deposits are even further encouraged. Once formed, dendrites grow progressively on repeated cycling as the current density at the tips is higher than at flat locations. Eventually the dendrites reach the cathode and the battery is shorted long before its useful capacity has been exhausted. One way to mitigate this is by flowing the electrolyte in the battery. This changes zincate mass transfer from diffusion control to convection control and can bring the system closer to the equilibrium, reducing the non-uniformity of deposition. Further information about flow-assisted batteries can be found in Y. Ito, M. Nyce, R. Plivelich, M. Klein, D. Steingart, S. Banerjee, J. Power Sources 196 (2011) 2340. Though this method works effectively to reduce the non-uniformity, it does not completely eliminate dendrite formation.

There is another factor that can influence dendrite formation. When the Coulombic efficiency of the cathode is lower than that of the anode, not all zinc can be stripped from the anode current collector even with a full discharge. The remained metal is often spotty and can act as nuclei for zinc electrodeposition during subsequent charge cycles. This serves to accelerate the non-uniformity of the deposition, and the zinc layer can become more and more uneven as cycling continues. When any portion of the deposited zinc reaches the cathode, the battery is shorted.

In addition to flowing the electrolyte, there have been a number of other approaches for mitigating the dendrite problem in zinc-based batteries. A wide variety of additives such as lead oxide, bismuth oxide, and organic chemicals have been used in the electrolyte. See, for example, "Development of Ni—Zn cells," Journal of Power Sources, 34 (1991) 243-255; "Methods for the reduction of shape change and dendritic growth in zinc-based secondary cells," Journal of Power Sources 35 (1991) 333-351; "Study of the influence of the polyalcohol mannitol on zinc electrodeposition from an alkaline bath," J Appl Electrochem (2010) 40: 1625-1632; "Influence of surfactants on electrochemical behavior of zinc electrodes in alkaline solution," Journal of Power Sources 72 (1998) 231-235; and "The inhibition of the spongy electrocrystallization of zinc from doped flowing alkaline zincate solutions," Journal of Power Sources 193 (2009) 890-894. However, it can be difficult to tune the additive concentration to an optimal range. There is much uncertainty in finding the optimal concentration, as it depends on numerous factors, such as zinc concentration in the electrolyte, flow rate of the electrolyte, and charge and discharge rates of the battery. In addition, especially in the case of organic additives, electrolyte quality can deteriorate as cycling progresses, so an additive concentration that works well initially may work less well in later cycles. If the additive concentration is too high, the electrodeposited zinc morphology may become even more problematic, and in some cases, zinc may be prevented from depositing on the anode current collector altogether.

Another common method to mitigate the dendrite problem in zinc-based batteries is pulse charging, wherein charge current is delivered to the battery in pulses with short rest periods in between. See, for example, "Development of Ni—Zn cells," Journal of Power Sources, 34 (1991) 243-255. Without wishing to be bound by any particular theory, it may be that rest periods allow chemical reactions in the battery to stabilize before more charge is delivered. Pulse charging may also reduce unwanted chemical effects at the anode surface such as gas formation, crystal growth and passivation. But pulse charging requires complicated charging equipment, adds extra time to charging, and reduces charging efficiency.

What is needed is a simple, robust, low-cost way to mitigate the dendrite problem in zinc-based secondary batteries, so that they can achieve very long cycle lives and become viable options for large-scale energy storage.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

A novel new anode current collector for a rechargeable battery is described. The battery has a cathode with a first overall surface area and a first effective surface area, an anode current collector with a second overall surface area and a second effective surface area, and an electrolyte in ionic communication with both the cathode and the anode current collector. The second effective surface area is between about 10 and 90% of the first effective surface area. In another arrangement, second effective surface area is between about 25% and 75% of the first effective surface area. In another arrangement, the second effective surface area is between about 40% and 60% of the first effective surface area. The first overall surface area and the first effective surface area of the cathode may or may not be the same. The first overall surface area of the cathode and the second overall surface area of the anode current collector may or may not be about the same.

In some arrangements, the cathode comprises nickel, such as nickel oxide hydroxide or nickel oxyhydroxide (often referred to as nickel oxide or nickel hydroxide, respectively). The anode current collector may be any of nickel, nickel-coated copper, copper, silver-coated copper, cadmium-coated copper, and brass. The anode current collector may have the form of perforated sheets, expanded metals, meshes, thin strip metal sheets, and/or wires. In another arrangement, the anode current collector has one or more regions that are coated to prevent electrodeposition of metals. In one arrangement, the electrolyte is configured to flow along the cathode and the anode current collector as the battery charges. In some arrangements, the anode current collector is configured to accept electrodeposition of an anode metal such as zinc, lead, lithium, cadmium, or copper.

DETAILED DESCRIPTION

The preferred embodiments are illustrated in the context of zinc electrodeposition in zinc-based secondary batteries. The skilled artisan will readily appreciate, however, that the materials and methods disclosed herein will have application in a number of other contexts where uniform and compact metal electrodeposition is desirable.

These and other objects and advantages of the present invention will become more fully apparent from the following description taken in conjunction with the accompanying drawings.

All publications referred to herein are incorporated by reference in their entirety for all purposes as if fully set forth herein.

In this disclosure, the terms "negative electrode" and "anode" are both used to mean "negative electrode." Likewise, the terms "positive electrode" and "cathode" are both used to mean "positive electrode."

For the purposes of this disclosure, "overall surface area" is defined as the area enclosed by the outer edges of an electrode (or electrode current collector). The "effective surface area" is the electrochemically active surface area, such as the surface area available for metal deposition on the anode, which is defined as the "overall surface area" minus any areas contained within the overall surface area onto which metal cannot deposit and plus any additional areas that are available for metal deposition, such as the area of the surfaces on the walls of any open areas.

Due to increasing environmental concerns, zinc anode batteries have become especially desirable because of their unique advantages for clean energy storage. Batteries based on zinc metal anodes use plentiful, low-cost materials and have energy densities (~50-80 Wh/L that are high enough to make such batteries useful for stationary applications. In addition to having low environmental impact, zinc batteries allow repeated deep discharge cycling and are non-toxic, non-flammable, compatible with water, and can be handled easily and safely.

In the zinc-nickel battery system, a nickel oxide hydroxide or nickel oxyhydroxide (often referred to as nickel oxide or nickel hydroxide, respectively) positive electrode and a zinc negative electrode are used with a potassium, sodium, or lithium hydroxide electrolyte.

The reactions in the zinc-nickel battery system are as follows:

At the positive electrode: $2Ni(OH)_2+2OH^-=2NiOOH+2H_2O+2e^-$

At the negative electrode: $Zn(OH)_4^{2-}+2e^-=Zn+4OH^-$

The overall reaction: $2Ni(OH)_2+Zn(OH)_4^{2-}\rightarrow 2NiOOH+2H_2O+2OH^-+Zn$ During charging, nickel hydroxide is oxidized to nickel oxyhydroxide at the cathode, and zincate ($Zn(OH)_4^{2-}$) is reduced to zinc which is deposited on the anode current collector. With a deep discharge it may be possible to strip most or all zinc from the anode current collector while evolving hydrogen from the cathodes. Hydrogen can be formed during the discharge process due to parasitic electrochemical reactions at the anode and to zinc corrosion. The theoretical open-circuit voltage of zinc-nickel battery is 1.73 V.

Figure 1:
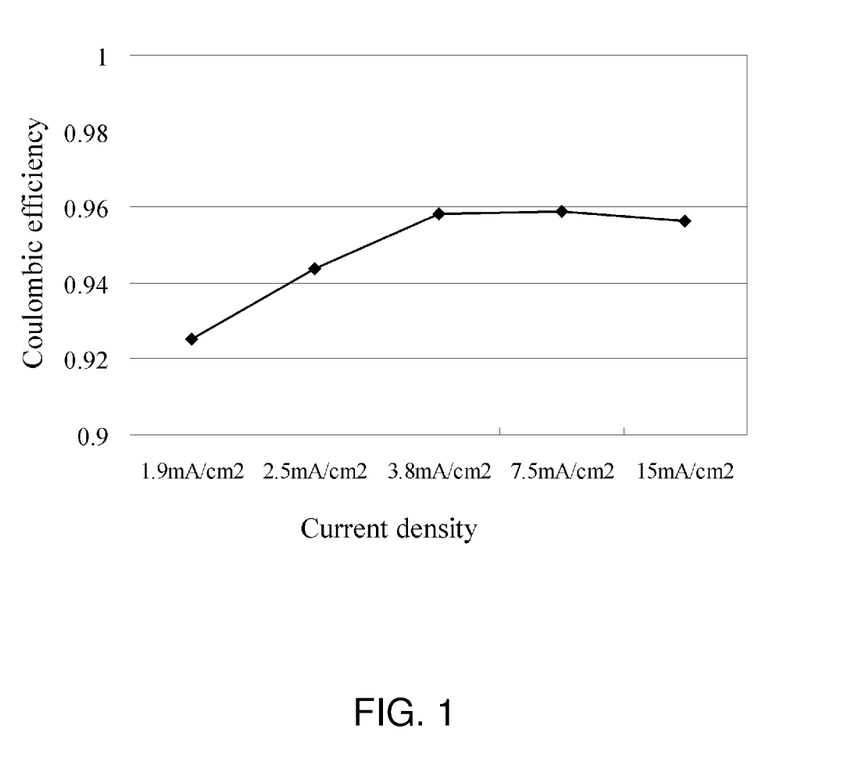
FIG. 1 is a graph of Coulombic efficiency as a function of current density for a zinc-nickel battery.

Battery performance is often evaluated by Coulombic efficiency which is the ratio of the number of charges that can be extracted from the battery during discharging to the number of charges that enter the battery during charging. In a battery, the anode and cathode each has its own Coulombic efficiency. The efficiencies are usually not the same, and the lower efficiency electrode determines the overall Coulombic efficiency of the battery, much as the weakest link determines the strength of a chain. For best performance, it useful to design a battery whose electrodes have similar Coulombic efficiencies and to include a way to rebalance the efficiencies when changes occur as the battery is cycled. For example, in zinc anode-nickel cathode batteries, the Coulombic efficiency of the zinc anode is usually higher than that of the nickel cathode, and the lower Coulombic efficiency of the nickel cathode determines the overall battery efficiency. In addition, batteries are subject to self-discharge when they are not cycling. If the self discharge rate of the anode is higher than that of the cathode, after some period of time, the retained energy in the anode will be smaller than the retained energy in the cathode, which can lead to an imbalance in Coulombic efficiencies between the two electrodes FIG. 1 is a graph of Coulombic efficiency as a function of current density for a zinc-nickel battery. Coulombic efficiency is about 96% at current densities higher than about 3.8 mA/cm$^2$, whereas it drops to 95% or less at current densities less than about 2.5 mA/cm$^2$. When the current density is higher than about 3.8 mA/cm$^2$, the Coulombic efficiency of the nickel cathode is about 96%, and that of zinc anode is higher than 96%. When the current density is decreased, the Coulombic efficiency at the anode is less than 96%. The decrease in efficiency at the anode may be due to decreased electrodeposition of zinc in favor of increased hydrogen evolution due to corrosion. Therefore, in this system, it is useful to maintain a current density higher than about 3.8 mA/cm$^2$ in order to maintain optimal Coulombic efficiency at the anode.

The performance of nickel cathodes can be adversely affected when the current density is too high. Reactions that result in oxygen evolution can dominate over desired nickel reactions when the battery is charged too quickly, i.e., is experiencing high current densities. The current densities that are optimum for nickel cathodes are lower that the optimum current densities for zinc anodes. The morphologies of electrodeposited metals change depending on (among other factors) applied current density on charging. For example, zinc morphology transitions from mossy (sponge-like, low-density) to compact (high-density) and finally to a dendritic structure as current density is increased. For a more detailed discussion of this, see, for example, J. W. Gallaway, D. Desai, A. Gaikwad, C. Corredor, S. Banerjee, D. Steingart, J. Electrochem. Soc. 157 (2010) Al279. Even as operating at current densities optimized for cathode performance may ensure a long-lived cathode, such current densities at the anode result in the risk of premature failure due to porous zinc morphology at the anode.

Figure 2A:
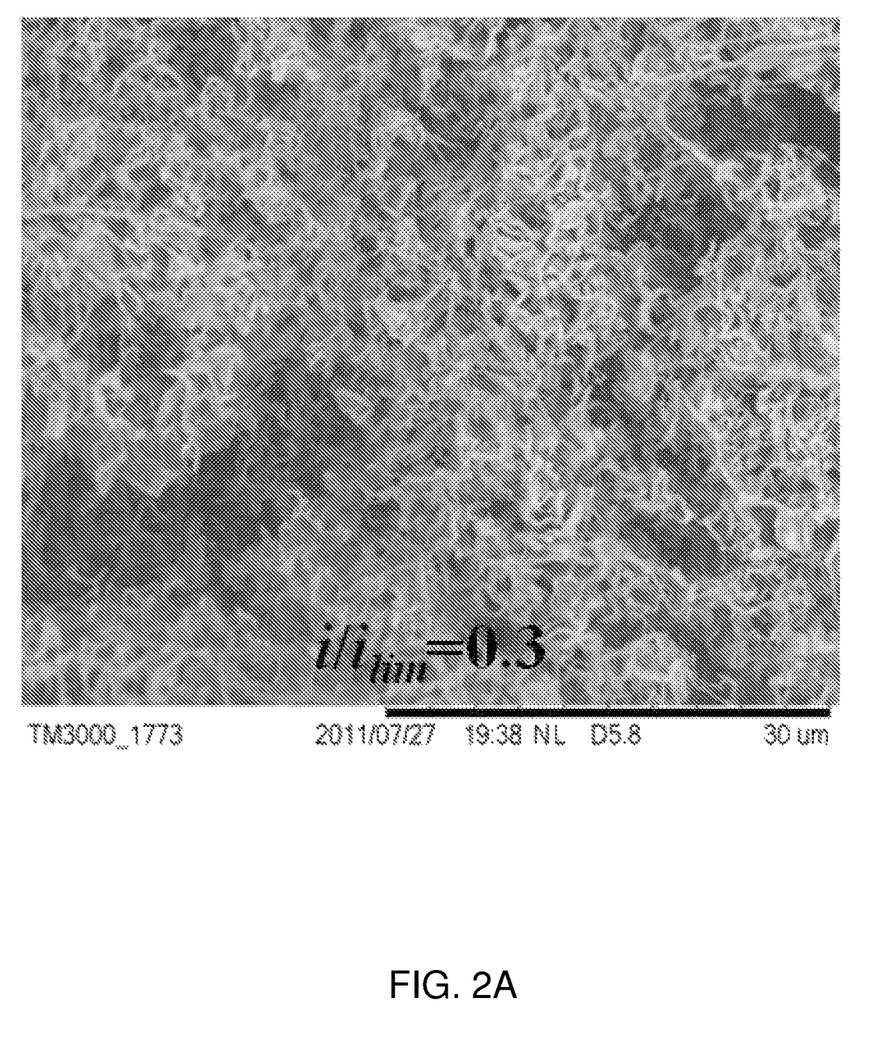
FIG. 2A is a scanning electron microscope (SEM) image that shows mossy zinc morphology.
Figure 2B:
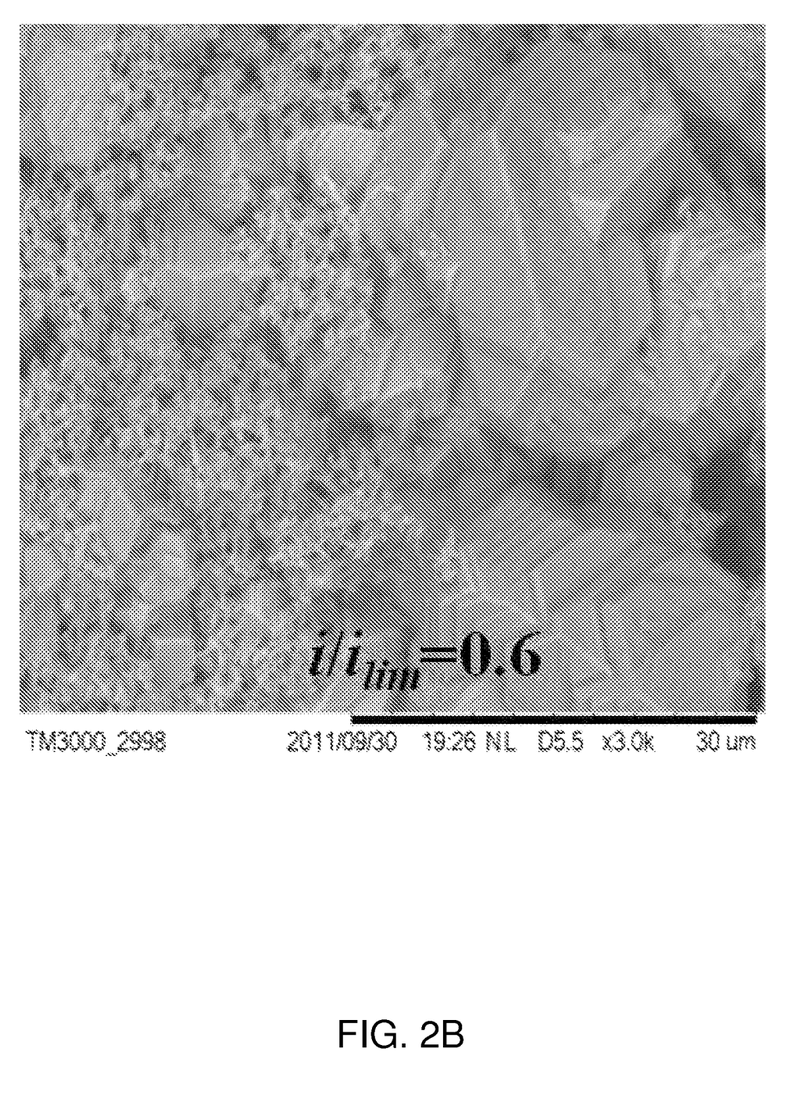
FIG. 2B is SEM image that shows mixed (both mossy and compact) zinc morphology.
Figure 2C:
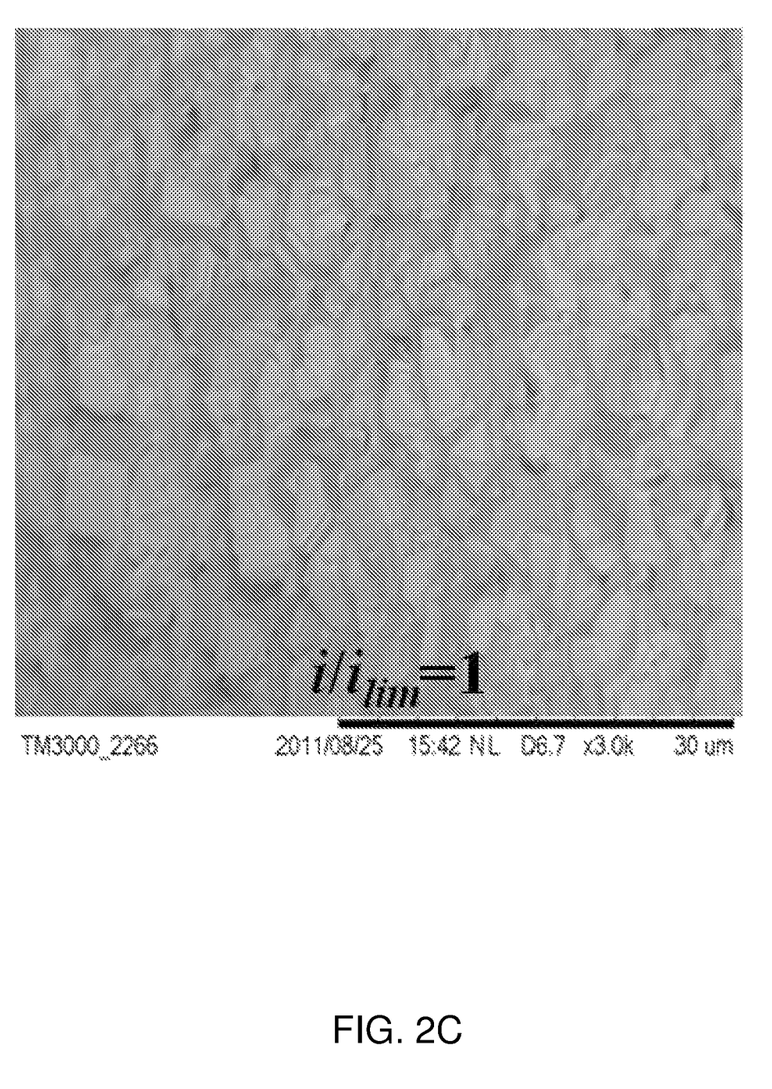
FIG. 2C is a SEM image that shows compact, crystalline zinc morphology.

Zinc morphology can be discussed as related to a normalized current density given by the current density ratio, $i/i_{lim}$, the ratio between effective current density, $i$, and a theoretical limiting current density, $i_{lim}$. When $i/i_{lim}$ is less than 0.4, the morphology of electrodeposited zinc is mossy and porous. An example of mossy zinc morphology is shown in the scanning electron microscope (SEM) image in FIG. 2A for an $i/i_{lim}$ of 0.3. When $i/i_{ilm}$ is between 0.4 and 0.9, the zinc morphology has a mixture of mossy and crystalline structures. An example of mixed zinc morphology is shown in the SEM image in FIG. 2B for an $i/i_{lim}$ of 0.6. When $i/i_{lim}$ is above 0.9, the zinc morphology is compact and crystalline. An example of compact and crystalline zinc morphology is shown in the SEM image in FIG. 2C for an $i/i_{lim}$ of 1.0. The mossy morphology is undesirable in a battery anode as it is not compact and can cause internal shorts. In addition, zinc can easily break off from the porous structure and be lost to the electrochemical activity of the battery. In addition, zinc corrosion (and its concurrent hydrogen evolution) is a surface phenomenon, so corrosion tends to occur more for larger surface areas. The most desirable zinc morphology is compact and crystalline, as this minimizes the possibility of internal shorts.

When current density is increased so that compact electrodeposition occurs at the anode, the overpotential may be very high and an undesirable amount of gas may evolve, particularly from the cathode side, significantly decreasing Coulombic efficiency. Although compact zinc deposition is desirable, extra gas evolution is not; the two effects serve to cancel each other out, so there is no overall advantage in running at such a high current density. Other anode metals that may behave similarly include but are not limited to lead, cadmium, and copper.

A novel, new design for anode current collectors in Zn—Ni batteries makes it possible to have things both ways. Current densities at the cathode can remain low enough to avoid gas evolution while the anode current density is effectively high enough to deposit zinc compactly. Now, both electrodes can operate optimally. By using a reduced-area current collector at the anode, the effective current density (ampere/square meter) at the anode can be much higher than at the cathode, while maintaining the same current flow between the electrodes. By careful design of the anode current collector, the battery can be tuned to provide a high enough current density at the anode without increasing the current density at the cathode and suffering adverse reactions.

Figure 3A:
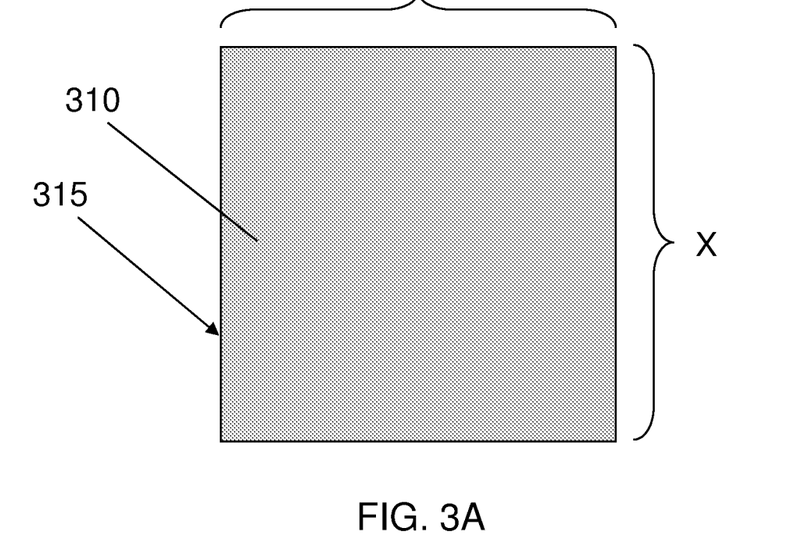
FIG. 3A is a plan-view schematic illustration of a conventional, flat-sheet electrode.
Figure 3B:
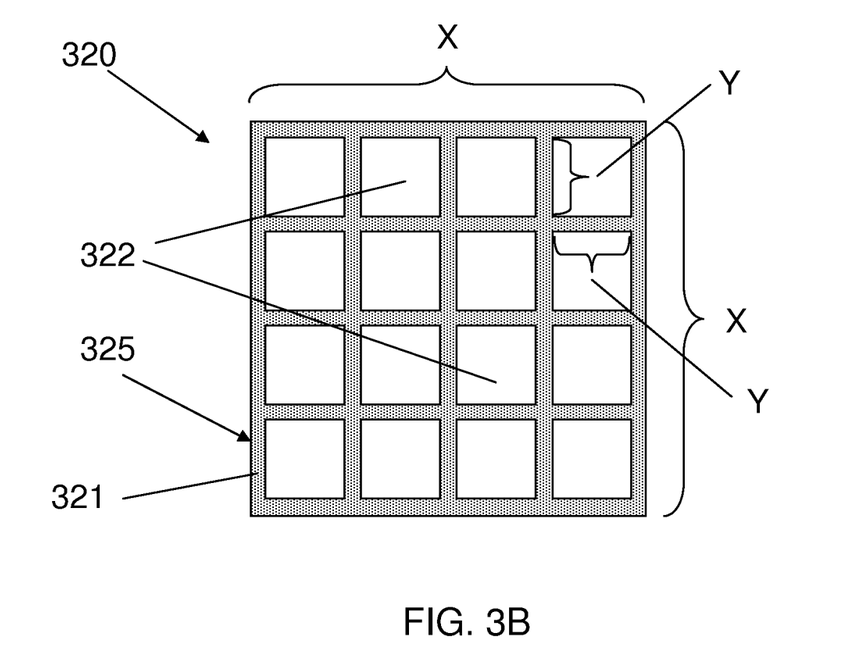
FIG. 3B is a plan-view schematic illustration of a reduced area anode current collector, according to an embodiment of the invention.

The novel new anode design is shown in the schematic drawings in FIGS. 3A and 3B, according to an embodiment of the invention. FIG. 3A is a plan-view schematic illustration of a conventional cathode 310, which is a flat sheet of material such as nickel. The outside edge 315 of the cathode 310 is X units on each side and encloses an overall surface area of X$^2$ square units. FIG. 3B is a schematic illustration of a novel, reduced-area anode current collector 320, according to an embodiment of the invention. Instead of a solid, flat sheet, the anode current collector 320 is a perforated metal sheet 321 that is X units on each side and contains 16 open spaces 322 which each has an area of Y$^2$. The metal 321 can be, for example, nickel, nickel-coated copper, copper, silver-coated copper, cadmium-coated copper, brass, or other metals suitable for use as an anode current collector in a zinc, lead, lithium, cadmium, or copper anode battery. The outside edge 325 of the anode current collector 325 encloses an overall surface area of X$^2$ square units. For the purposes of this disclosure, the "overall surface area" is defined as the area enclosed by the outer edges of the electrode (or electrode current collector). The "effective surface area" is the surface area available for zinc deposition, which is defined as the "overall surface area" minus any areas contained within the overall surface area onto which zinc cannot deposit and plus any additional areas that are available for zinc deposition, such as the area of the surfaces on the walls of the open areas. If the electrode shown in FIG. 3A were a metal current collector, the overall surface area and the effective surface area would be the same. But for the perforated electrode shown in FIG. 3B, the effective surface area is not the same as the overall surface area. When the open spaces 322 and the surfaces of their walls are taken into account, the effective surface are area of the anode current collector 321 is $((X^2-16Y^2)+(4Yd\times16))$ square units, where d is the thickness of the anode current collector 321.

In another embodiment of the invention, the effective surface area of an anode current collector can be reduced by covering a portion of the current collector. Consider FIG. 3B as a schematic illustration of a novel, reduced-area anode current collector 320 that has coated regions 322 over part of the surface. The coating is impervious to electrolytes, and no zinc can be electrodeposited in the coated regions 322. The anode current collector 320 is X units on each side and contains 16 coated regions 322 which each have an area of Y$^2$. The metal 321 can be, for example, nickel, nickel-coated copper, copper, silver-coated copper, cadmium-coated copper, brass, or other metals suitable for use as an anode current collector in a zinc anode battery. In one arrangement, the coating is a polymer, a glass, or some other nonconductive material that can seal well against the current collector. The outside edge 325 of the electrode 325 encloses an overall surface area of $X^2$ square units. For the purposes of this disclosure, the "overall surface area" is defined as the area enclosed by the outer edges of the electrode (or electrode current collector). For the coated electrode shown in FIG. 3B, the effective surface area is not the same as the overall surface area. When the coated regions 322 are taken into account, the effective surface area of the anode current collector 321 is $(X^2-16Y^2)$ square units.

In one embodiment of the invention an anode current collector can have both perforations and coated regions to achieve a reduced area.

Examples of reduced-area anode current collectors 320 include, but are not limited to, perforated sheets such as expanded metals, meshes, thin strip metal sheets, and wires. In one embodiment of the invention, the effective surface area of the anode current collector 325 is between about 10% and 99% of the area of the cathode 310. In another embodiment of the invention, the effective surface area of the anode current collector 325 is about between about 25% and 75% of the cathode 310. In another embodiment of the invention, the effective surface 0 area of the anode current collector 325 is between about 40% and 60% of the area of the cathode 310.

There is no requirement that the cathode and the reduced area anode current collector have the same overall surface area. In some embodiments of the inventions, the reduced area current collector has an overall surface area that is much smaller than the overall surface area of the cathode. For example, when it is desired for a reduced area current collector to have an effective surface area that is 25% of the overall area $(X^2)$ of the cathode, many current collector configurations can be used. In one arrangement, the current collector is a square solid sheet whose sides are each $0.5X$ long. The overall surface area of the current collector is $0.25X^2$, and the effective surface area of the current collector is also $0.25X^2$. In another arrangement, any combination of solid areas and open areas can be used for the current collector, as long as the effective surface area is $0.25X^2$. In another embodiment of the invention, care is taken to ensure that the overall surface area of the current collector is approximately the same as the overall surface area of the cathode, as this may help to maintain relatively constant electric fields across the anode.

As discussed above, zinc can be electrodeposited not only on the surface of the reduced area anode current collector that faces the cathode but also on the edge surfaces of the perforations, this is, along the sides of the open spaces. This affords an additional benefit for the battery as much of the zinc deposition can be within the perforations of the current collector. Thus there is less zinc depositing on the surface of the anode current collector that faces the cathode, making it much less likely that zinc deposits will reach the cathode and avoiding a short circuit that would shut down the battery.

Yet another benefit or a reduced area current collector is that batteries become lighter and cell assembly becomes simpler when reduced area current collectors are used. This results in higher energy density and may also result in lower cost.

Figure 4:
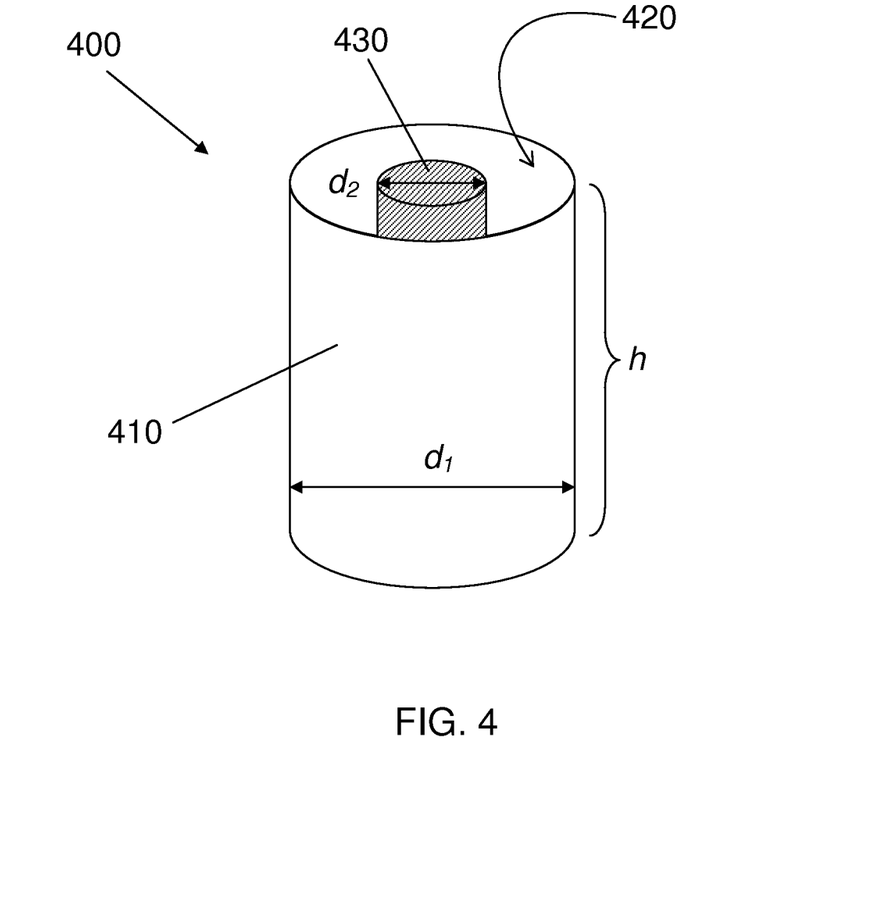
FIG. 4 is a schematic drawing that shows a reduced area anode current collector as can be used in a cylindrical battery, according to an embodiment of the invention.

In another embodiment of the invention, a reduced area anode current collector can be used in a cylindrical battery 400, as show in the schematic figure in FIG. 4. The battery 400 has a cylindrical case 410 that encases a cathode 420 that also has a cylindrical shape. There is an anode current collector 430 positioned at the center of the cylindrical cathode 420. The cylindrical cathode has a height h, a diameter $d_1$, and a surface area $\pi d_1 h$. The anode current collector 430 has a height h, a diameter $d_2$, and a surface area $\pi d_2 h$. The ratio of the anode current collector 430 surface to the cathode 420 surface is given by $\pi d_2 h / \pi d_1 h$, which equals $d_2/d_1$. The ratio of the diameters of the anode current collector 430 to the cylindrical cathode 420 gives the ratio of the surface areas. In another embodiment of the invention, the central anode current collector 430 has shapes other than a solid cylinder. The anode current collector 430 may be a mesh, a cylinder with perforations, a wire, a wire with protrusions—any shape that provides an anode current collector with desirable reduced area relative to the cathode 420. In one embodiment of the invention, the effective surface area of the anode current collector 430 is between about 1% and 95% of the area of the cathode 420. In another embodiment of the invention, the effective surface area of the anode current collector 430 is about between about 20% and 80% of the cathode 420. In another embodiment of the invention, the effective surface area of the anode current collector 430 is between about 35% and 65% of the area of the cathode 420.

Periodic reconditioning is a method that can be used to prevent short circuiting and to resolve efficiency imbalances between two electrodes. The reconditioning procedure consists of a slow discharge to a lower voltage. It enables the deposited metal on the anode current collector to dissolve fully into the electrolyte, thus refreshing the surface of the current collector as if no metal had been deposited on it. Though this method can be useful, it is not only time consuming, but it can also lower the overall energy efficiency of the battery. Thus, it is desirable to minimize the frequency of reconditioning cycles. By using reduced area anode current collectors as described herein, there is less need for reconditioning. The electrodes are already balanced in their efficiencies.

EXAMPLES

The following example provides details relating to composition, fabrication and performance characteristics of zinc-based batteries in accordance with the present invention. It should be understood the following is representative only, and that the invention is not limited by the detail set forth in these examples.

Experiments were carried out for zinc anode-nickel cathode batteries. The battery cell was a prismatic zinc-nickel cell. The cell pack consisted of two positive and negative plates layered alternately with a 2.5 mm gap in between. Zinc metal was deposited on a current collector to act as the negative electrode (anode). The reduced-area current collector used for the mesh cell was a nickel-coated expanded copper (DEXMET 5Cu10-125) sheet which had a thickness of 0.127 mm, a strand thickness of 0.254 mm, and a porosity of 68%. A nickel-coated copper sheet current collector was used for the sheet cell which was used as a reference. A sintered nickel electrode was used as the cathode.

Zinc oxide at a concentration of 60 g/L was dissolved initially into 45 wt % potassium hydroxide (KOH) solution to be used as an electrolyte. The electrolyte flowed from the bottom to the top of the cell. Galvanostatic (constant current) battery cycling experiments were carried out. Experiments were carried out for applied charge rates of C/4, C/2, 0.75 C, and 1 C, and for a discharge rate of 1 C for all cases. Table I shows the charge rate, the apparent current density for the sheet cell, and the effective current density for the mesh cell. The apparent current density was calculated based on the overall surface area of the anode electrode, and the effective current density was calculated based on the effective surface area of the mesh. The effective current density for the sheet cell was the same as the apparent current density, and the current density was no more than 34.6 mA/cm². The charge was terminated when the battery cell was charged to the full rated capacity of the nickel electrodes, and discharge was terminated when the cell voltage dropped to 1.0 V.

The zinc morphology for the mesh cell became dense and compact as the charge rate increased, especially at charge rates greater than 0.75 C. On the other hand, the zinc morphology for the sheet cell was mossy and very porous even at a charge rate of 1 C. The zinc morphology for the sheet cell was similar to that of the mesh cell at charge rates of C/4 or C/2, where the local current densities are similar. The zinc morphology is crystalline and dense for high effective current densities and is mossy and fibrous at low current densities. In general, electrodeposition of zinc becomes compact when the effective current density is higher than about 60 mA/cm². The morphology results suggest that zinc morphology is determined mainly by the effective current density.

TABLE I

| Figure | Charge Rate | Apparent Current Density (mA/cm²) | Effective Current Density (mA/cm²) |
|--------|-------------|-----------------------------------|------------------------------------|
| 3A | C/4 | 8.8 | 27.6 |
| 3B | C/2 | 17.7 | 55.5 |
| 3C | 0.75 C | 26.3 | 82.3 |
| 3D | 1 C | 34.6 | 108.1 |

Figure 5:
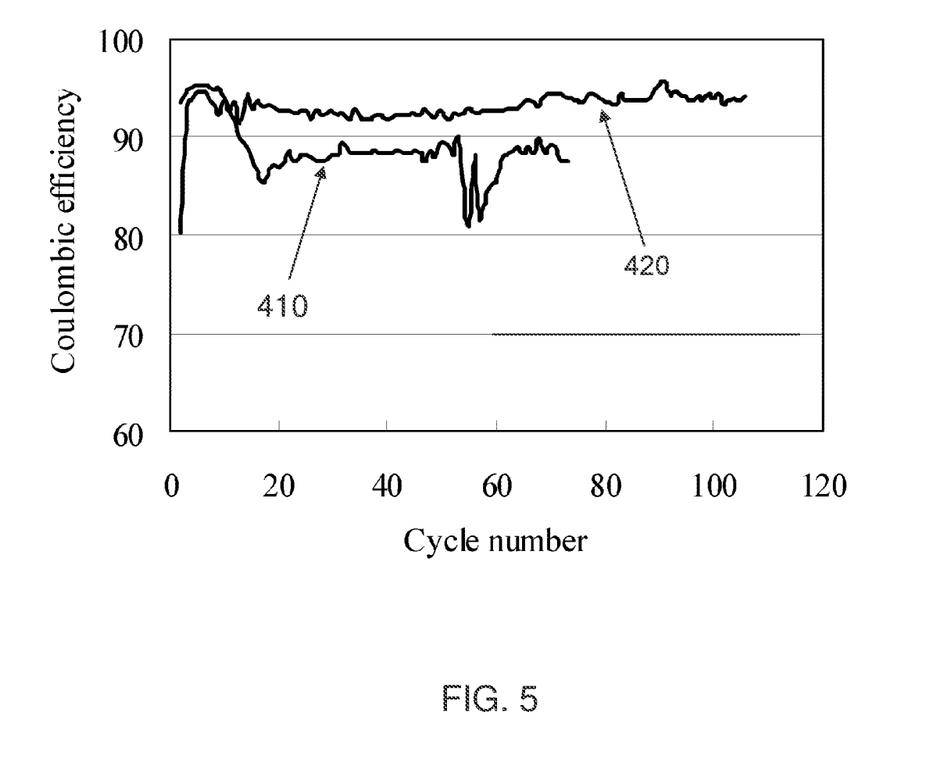
FIG. 5 is a graph that shows Coulombic efficiency as a function of cycle number at a charge rate of 0.75 C for both sheet and mesh cells.

FIG. 5 is a graph that shows Coulombic efficiency as a function of cycle number at a charge rate of 0.75 C for both sheet 410 and mesh 420 cells. While the initial Coulombic efficiency of 93% remains for more than 100 cycles for the mesh cell, it dropped to 88% at the 15th cycle for the sheet cell. The zinc was found to be touching the nickel cathode in the sheet cell, but not in the mesh cell. The decrease in Coulombic efficiency after 15 cycles seems to have been caused by soft short circuits. These results suggest that a mesh battery can cycle for more than 100 cycles without reconditioning, whereas without reconditioning the sheet cell fails after only 15 cycles.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A rechargeable battery, comprising:
    a cathode, the cathode having a first overall surface area and a first effective surface area;
    an anode current collector, the anode current collector having a second overall surface area and a second effective surface area; and
    an electrolyte in ionic communication with both the cathode and the anode current collector;
    wherein the second effective surface area is between 10 and 90% of the first effective surface area; and
    wherein the anode current collector has one or more regions that are coated to prevent electrodeposition of metals.

2. The rechargeable battery of claim 1 wherein the anode current collector is configured to accept electrodeposition of an anode metal selected from the group consisting of zinc, lead, lithium, cadmium, and copper.

3. The rechargeable battery of claim 1 wherein the first overall surface area and the first effective surface area are the same.

4. The rechargeable battery of claim 1 wherein the first overall surface area and the second overall surface area are about the same.

5. The rechargeable battery of claim 1 wherein the second effective surface area is between about 25% and 75% of the first effective surface area.

6. The rechargeable battery of claim 1 wherein the second effective surface area is between about 40% and 60% of the first effective surface area.

7. The rechargeable battery of claim 1 wherein the cathode comprises nickel.

8. The rechargeable battery of claim 1 wherein the anode current collector comprises a metal selected from the group consisting of nickel, nickel-coated copper, copper, silver-coated copper, cadmium-coated copper, and brass.

9. The rechargeable battery of claim 1 wherein the anode current collector has one or more forms selected from the group consisting of perforated sheets, expanded metals, meshes, thin strip metal sheets, and wires.

10. The rechargeable battery of claim 1 wherein the regions are coated with a material selected from the group consisting of polymers and glasses.

11. The rechargeable battery of claim 1 wherein the electrolyte comprises one or more selected from the group consisting potassium hydroxide, sodium hydroxide, and lithium hydroxide.

12. The rechargeable battery of claim 1 wherein the electrolyte is configured to flow along the cathode and the anode current collector as the battery charges.

13. The rechargeable battery of claim 12, further comprising a pump configured to cause the electrolyte to flow.

14. The rechargeable battery of claim 1,
    wherein the cathode comprises a nickel oxide hydroxide or nickel oxyhydroxide cathode;
    wherein the anode current collector comprises a perforated nickel anode current collector; and
    wherein the electrolyte comprises a potassium hydroxide electrolyte.

15. The rechargeable battery of claim 14, wherein the potassium hydroxide electrolyte is configured to flow along the cathode and the anode current collector as the battery charges.

* * * * *